L. H. FARRIER.
MULTIPLE BORING AND TURNING MILL.
APPLICATION FILED JULY 8, 1907.
905,680.
Patented Dec. 1, 1908.
6 SHEETS—SHEET 1.
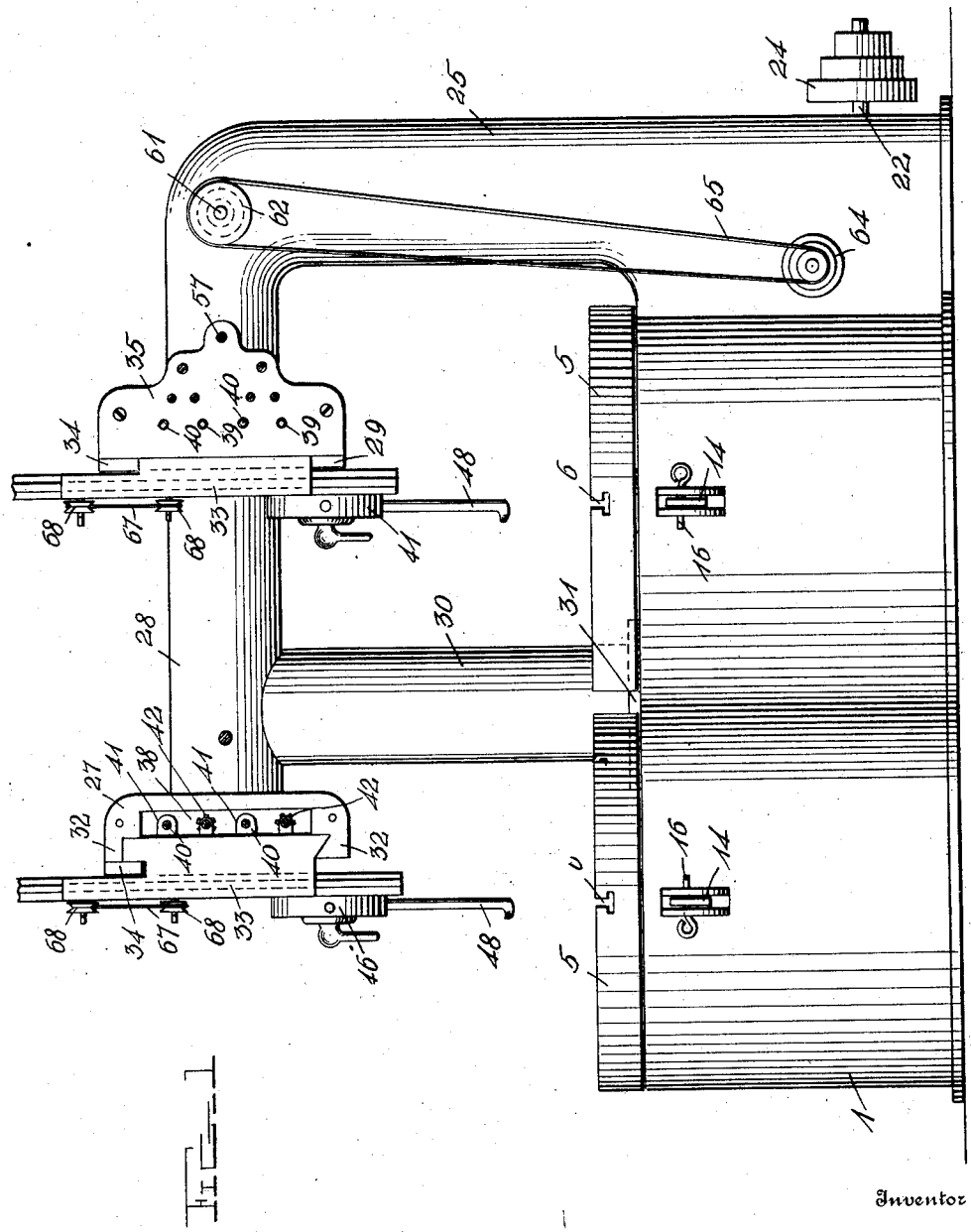
Witnesses
Inventor
Louis H. Farrier
By Benj. G. Cool
Attorney L. H. FARRIER.
MULTIPLE BORING AND TURNING MILL.
APPLICATION FILED JULY 8, 1907.
905,680.
Patented Dec. 1, 1908.
6 SHEETS—SHEET 2.
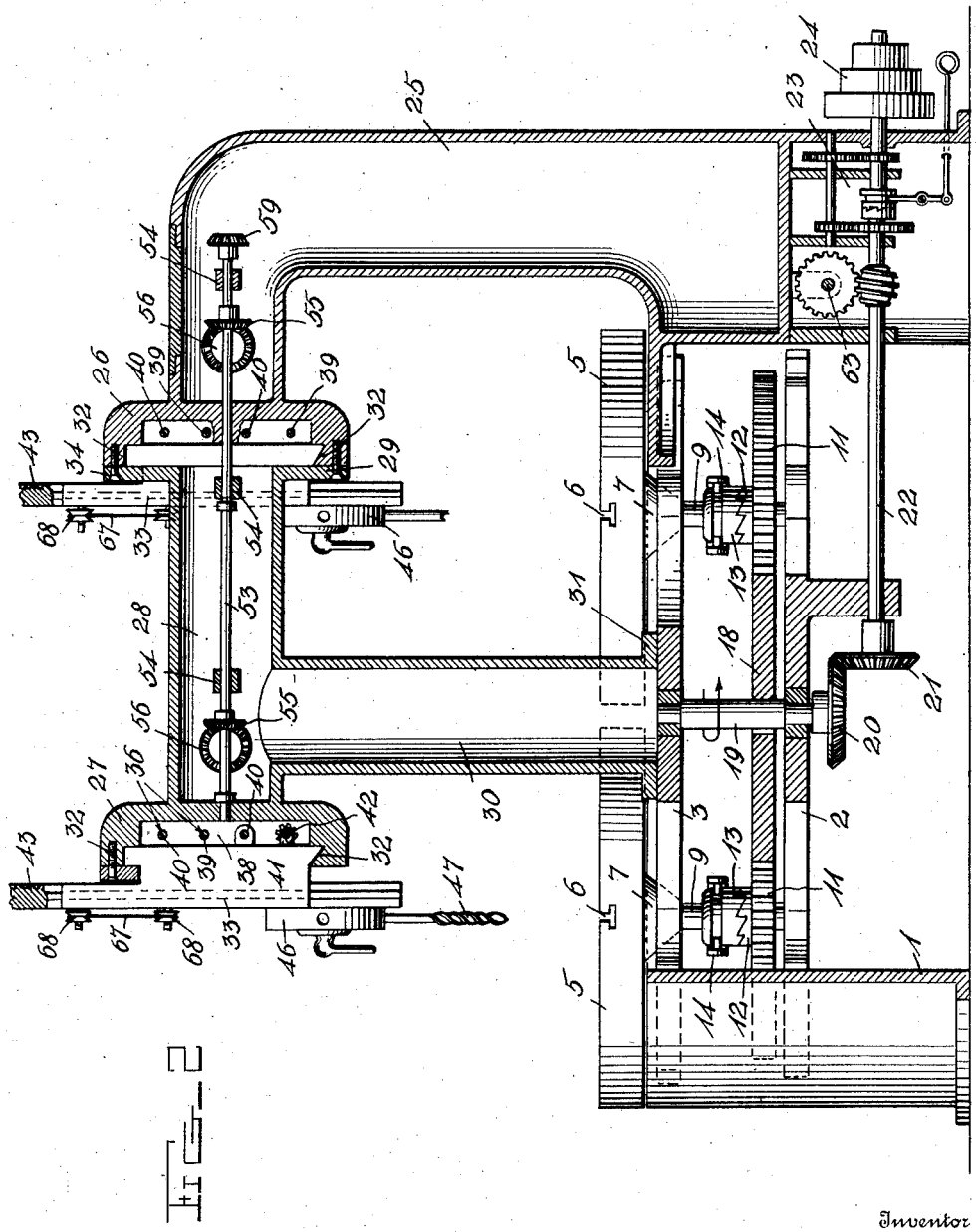
Witnesses
Inventor
Louis H. Farrier
By
Attorney L. H. FARRIER.
MULTIPLE BORING AND TURNING MILL.
APPLICATION FILED JULY 8, 1907.
905,680.
Patented Dec. 1, 1908.
6 SHEETS—SHEET 3.
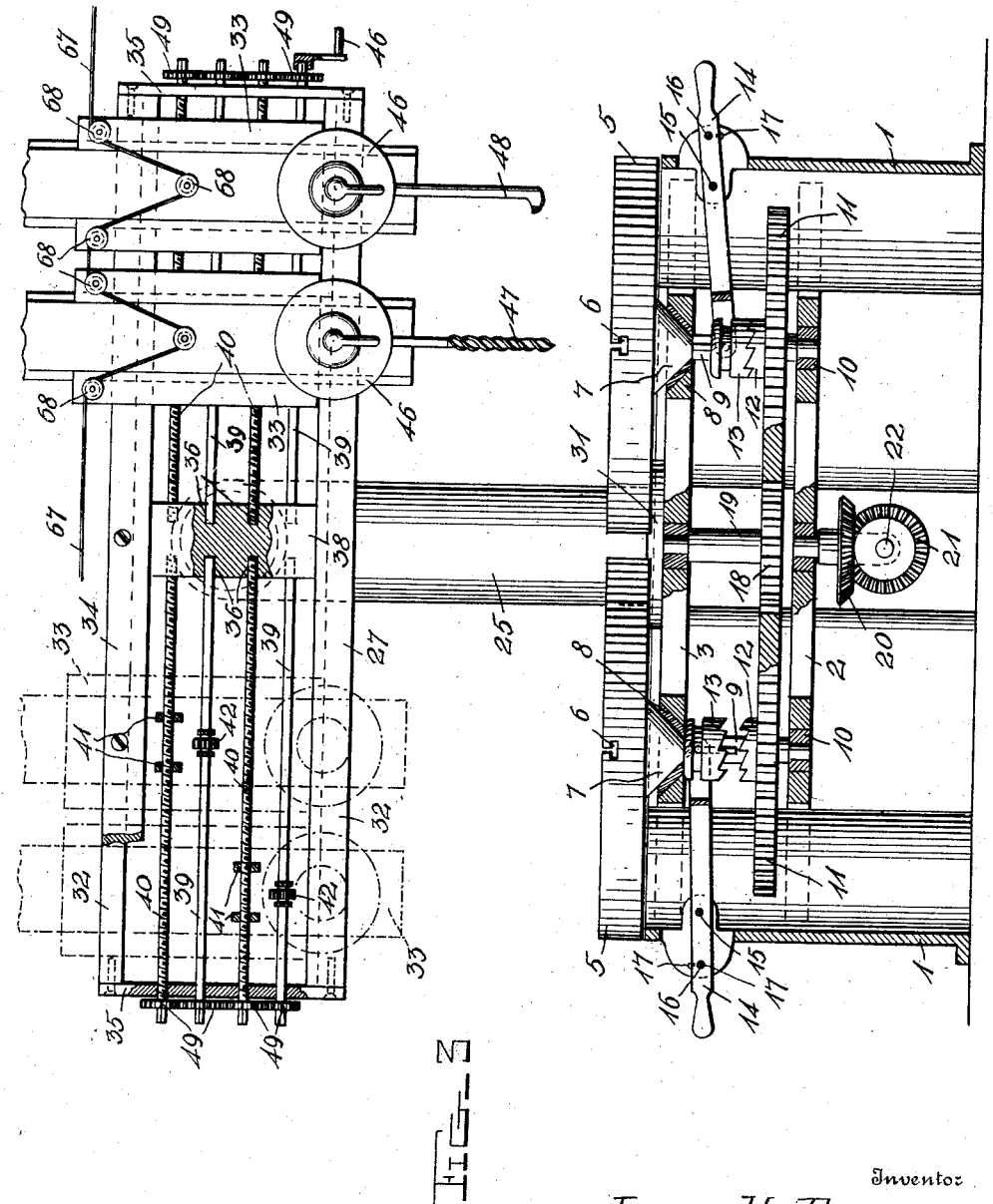
Witnesses
Inventor
Louis H. Farrier
By Benj. G. Cowl
Attorney

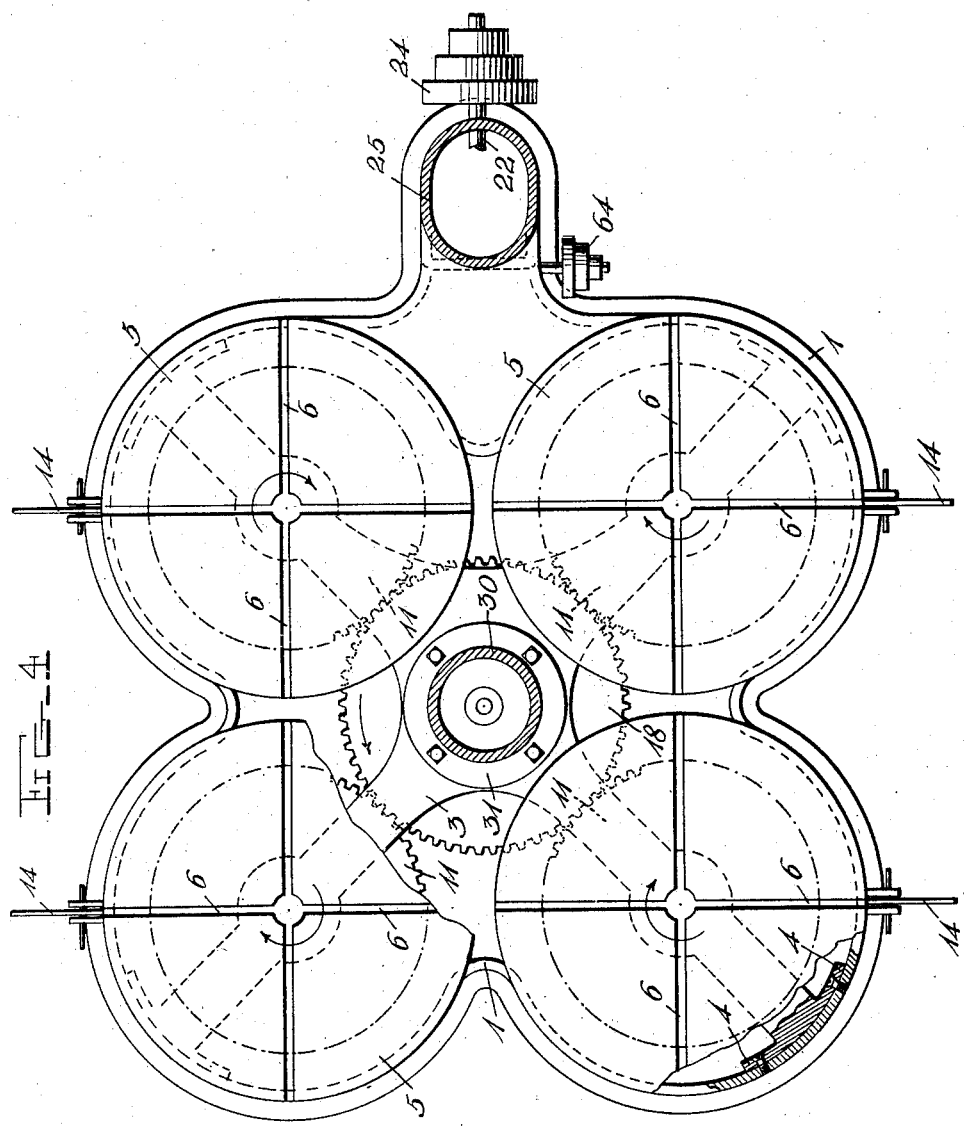

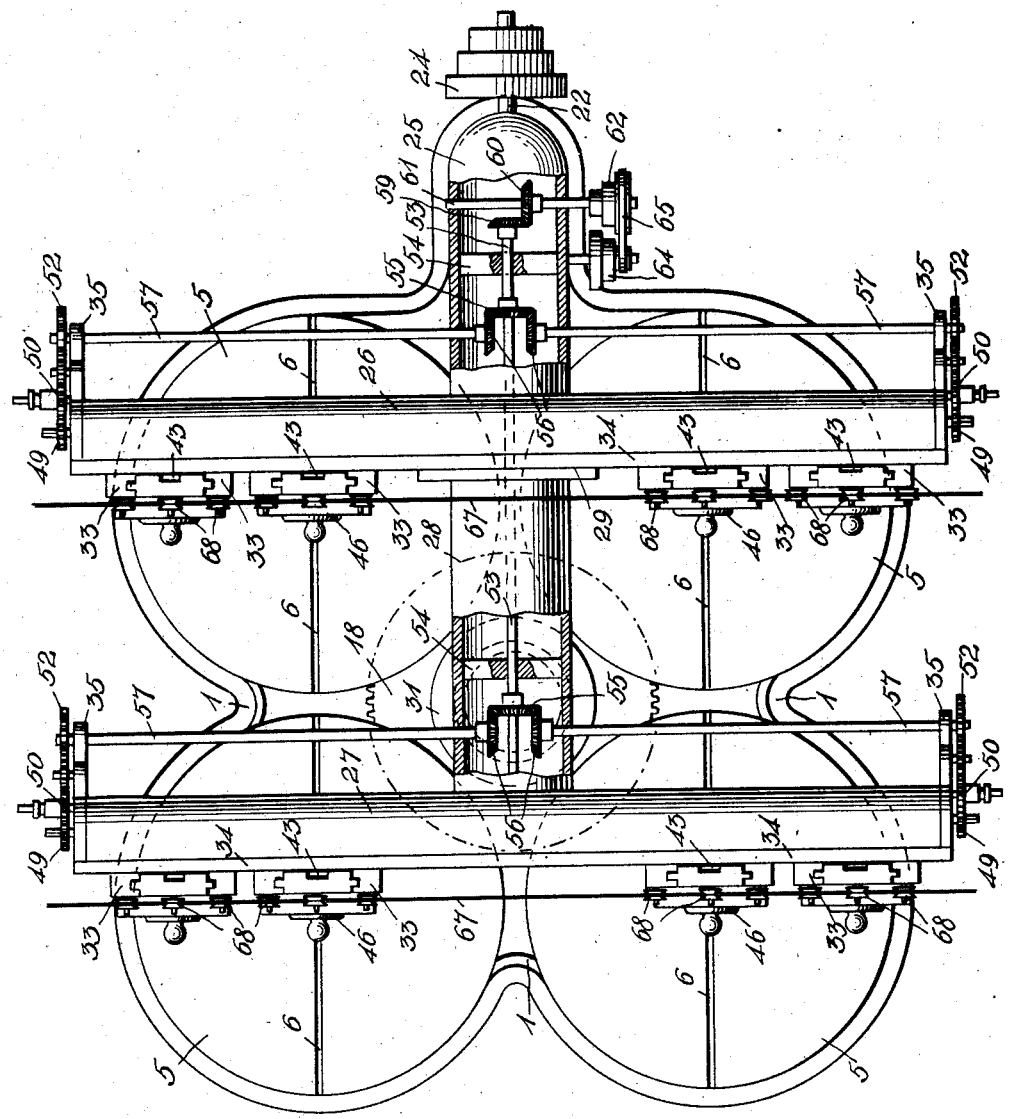

L. H. FARRIER.
MULTIPLE BORING AND TURNING MILL.
APPLICATION FILED JULY 8, 1907.
905,680.
Patented Dec. 1, 1908.
6 SHEETS—SHEET 6.
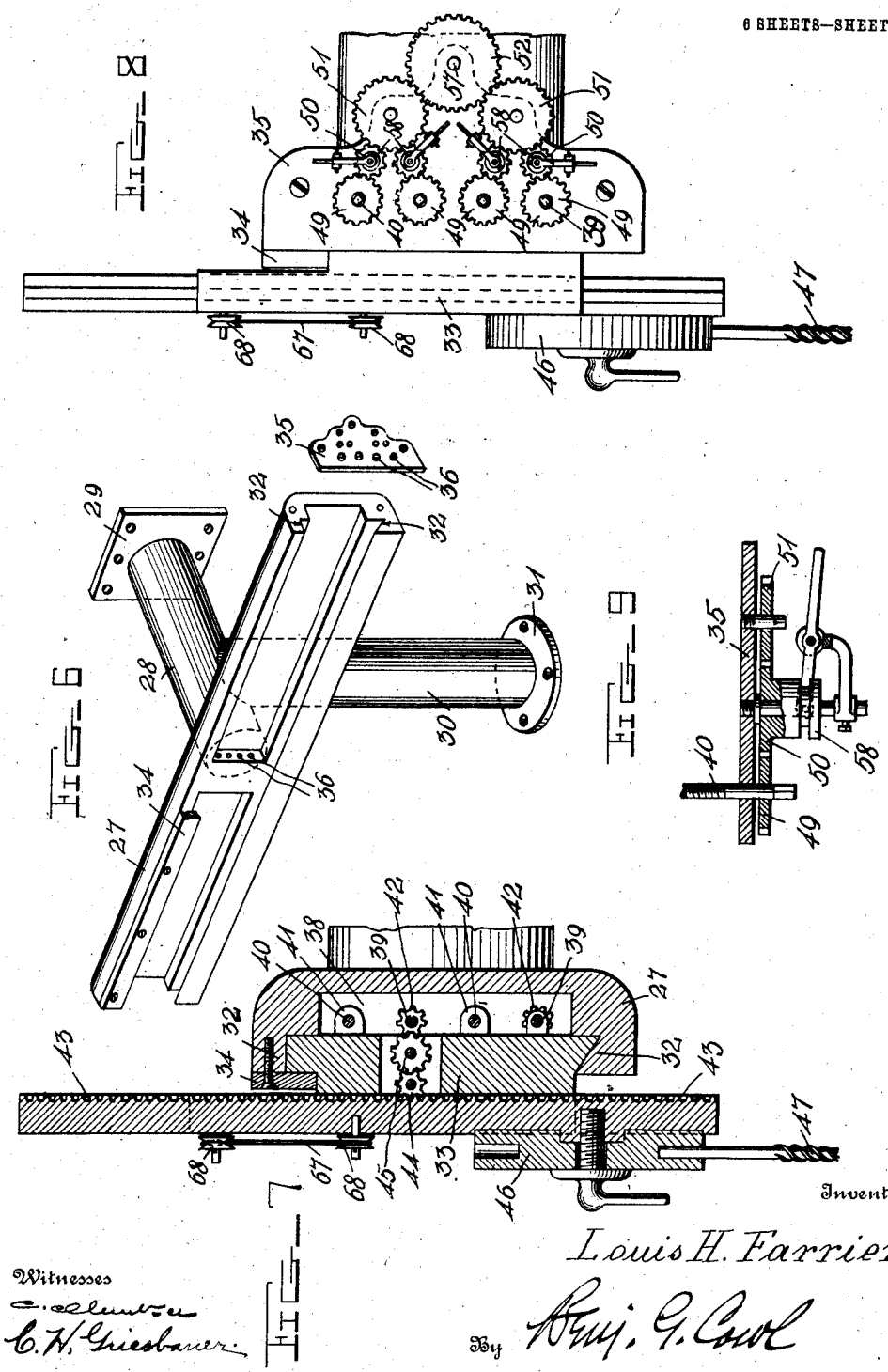
Witnesses
Inventor
Louis H. Farrier
By
Attorney

UNITED STATES PATENT OFFICE.

LOUIS H. FARRIER, OF NORTH TARRYTOWN, NEW YORK.

MULTIPLE BORING AND TURNING MILL.

No. 905,680.   Specification of Letters Patent.   Patented Dec. 1, 1908.

Application filed July 8, 1907. Serial No. 382,708.

*To all whom it may concern:*

Be it known that I, LOUIS H. FARRIER, a citizen of the United States, residing at North Tarrytown, in the county of Westchester and State of New York, have invented new and useful Improvements in Multiple Boring and Turning Mills, of which the following is a specification.

This invention relates to improvements in boring and turning mills, and has for its object to produce a mill in which series of operations upon one or more articles may be carried on simultaneously, whereby the output may be largely increased without a corresponding increase of attendants or manual labor.

In the accompanying drawings, which illustrate the invention in one form, Figure 1 is a broken side elevation of a machine embodying the invention; Fig. 2 is a vertical sectional view of the same; Fig. 3 is a similar view taken at right-angles to Fig. 2; Fig. 4 is a broken top plan view of the base and face plate; Fig. 5 is a broken top plan view of the machine; Fig. 6 is a broken perspective view of the center column or support, with one of the end plates detached; Fig. 7 is an enlarged sectional view through one of the saddles and a tool holder; Fig. 8 is an enlarged end view of the same; and Fig. 9 is a detail view of the locking or clutch mechanism.

Referring more particularly to the drawings, which are for illustrative purposes only and are, therefore, not drawn to scale, 1 indicates the base or substructure of the machine, which, as shown, is a hollow frame work, and is provided internally with bearing plates, or supports, 2 and 3, which may be either integral with the base or secured thereto, and the function of which will hereinafter appear.

As shown in Fig. 4, each bearing plate is in the form of a four-armed spider, the terminals of which are shown as provided with lateral flanges, 4, that are bolted or otherwise secured to the inner sides of the base. As viewed in plan, the base consists in this instance, and, preferably, though not necessarily so, of four approximately semicircular sections, each of which has disposed above it, a circular table or face plate, 5, provided with inverted T-shaped channels, 6, to receive the clamps or bolts by which the work is secured in position. Each of the face plates, of which there are four shown in this instance, is provided at its center and on its underside with a cone-shaped journal, 7, adapted to engage a similarly shaped bearing, 8, in the plate, 3, as shown in Fig. 3, whereby the table is caused to always rotate in a horizontal plane, and with the greatest possible accuracy. Depending from the table and extending into the journal 7, is a shaft, 9, the lower end of which works in a bearing, 10, in the plate 2.

The shaft carries a gear wheel, 11, having on its upper face a clutch member, 12, that is designed to be engaged by a clutch member, 13, keyed for longitudinal movement upon the shaft, whereby the two clutch members are in engagement, the gear 11 will be driven and thus transmit motion to the shaft, 9. The clutch member 13 has connected with it in any preferred manner a shifting lever, 14, which is suitably pivoted at 15 in the base, and has its upper end projecting beyond the same. A locking pin, 16, is adapted to be passed through either of two orifices, 17, in the base, and through the lever 14, whereby the clutch member 13 may be held in its operative position as shown at the right in Fig. 3, or in an inoperative position as shown at the left in said figure.

The gears 11 are engaged by a gear 18, upon a shaft, 19, which is suitably journaled in the plates, 2 and 3, and carries at its lower end a bevel gear, 20, that meshes with a similar gear, 21, carried by a driving shaft, 22. The shaft 22 is preferably formed in two sections, and provided with ordinary compound driving mechanism, 23, and has an ordinary cone pulley, 24, at its outer end for receiving power from any suitable source (not shown).

Secured to or cast integral with the base is a standard, 25, which has its upper end arranged so as to overhang the base, and thereby form a tool support. The overhanging portion of the standard is provided with two laterally extending cross heads, 26 and 27, and the forward end of the arm is preferably formed as a separate section, 28, which is secured to the rear cross head, 26, by means of a flange, 29, and is supported upon a standard or column, 30. The lower end of the column is secured to the top of the base, 1, between the face plate 5, as by means of a flange, 31.

One side of each of the cross heads, preferably the front or side farthest from the standard, 25, is formed into or provided with horizontal rails, 32, upon which the tool supports or saddles, 33, are mounted and adapted to slide in the ordinary manner. The upper edge of the saddle is preferably made rectangular, and is held in position upon the rails by means of a metal strip or guide-way, 34, which is bolted to the upper rail.

An end plate, 35, is secured to the outer end of each of the cross heads, and is provided with perforations or bearings, 36, which register with corresponding bearings, 37, in a centrally located lug or projection, 38. There are preferably four of these bearings arranged vertically for the reception of two shafts, 39 and two screws, 40, which are adapted to be driven by suitable gearing, as will be hereinafter described.

There are two saddles mounted upon each end of each cross head, making eight saddles in all, two for each of the face plates, 5, each provided with mechanism adapted to be actuated by one of the shafts 39 and screws, 40. The rear face of each saddle is provided with a lug or projection 41, which is screw-threaded for engaging with one of the screws, 40, whereby the saddle is moved laterally whenever the screw is rotated. A pinion, 42, on the saddle engages with the shaft by means of the ordinary slot and feather structure, whereby the pinion will be caused to rotate at any point upon the shaft, the slot in the shaft extending from end to end. The saddle is provided with an ordinary feed rack, 43, that is adapted to be moved vertically by means of a gear wheel, 44, which engages with the pinion, 42, and with an intermediate pinion, 45, which meshes with the rack, 43, on the rear of the tool bar. The rack, 43, is provided with any suitable means for holding the tools, as a turret, 46.

The cross heads are so arranged relatively to the face plates that the tools, as a drill, 47, and a bit, 48, as shown in Fig. 3, will stand, or can be brought into perfect alinement with the center of each face plate, thereby permitting of an internal cut being made by the tool held by one saddle and an external cut made by the tool held by the other saddle. In this manner, each face plate may be provided with an article to be "machined," as a pulley, which may have its hub bored and its face planed by the drill and bit, respectively, or the upper surface of the rim and hub may be trued or turned off by means of a suitable tool placed in the tool holder of either one or both of the saddles.

The rotation of the screw and shaft of each set is effected by a train of gearing comprising a pinion, 49, on the outer end of each, an idle pinion, 50, in engagement therewith, and a larger gear, 51, in engagement with the pinion 50. Each of the gear wheels 51 is in mesh with and driven by a gear wheel, 52, which receives its motion from a centrally arranged shaft, 53, journaled in the overhanging portion of the standard 25, as by means of spiders, 54. The shaft 53 is provided with two beveled wheels, 55, which engage with bevel wheels 56, which are mounted on the shafts 57 that carry the gear wheels, 52 at their outer ends. The idle pinion 50 is provided with any suitable clutch mechanism 58, whereby either one of them can be thrown into or out of gear, as desired, when it is necessary to rotate the shaft or screw, 39 and 40.

The shaft 53 is provided near its rear end with a bevel wheel, 59, which engages with a bevel wheel, 60, on a shaft, 61, that is journaled in the upper end of the standard 25, and is provided at its outer end with a cone-pulley, 62. The cone-pulley, 62, is driven from the main shaft 22, in any suitable manner, preferably by means of the usual worm gearing, 63, cone-pulley 64, and a belt, 65.

In addition to the automatic actuation of the feed screw and shaft, as above described, the outer end of each of them is made angular in cross section for the reception of the ordinary handle, 66, whereby they may be rotated manually and independently of the automatic feed. A cable 67 is provided, which passes over pulleys, 68, and is provided with the ordinary weights or balance at one or both ends, but which are not shown, as they may be of any desired construction.

By constructing a machine as above described, it will be seen that each set of tools can be operating upon an article secured to its face plate independently of or simultaneously with any or all of the other sets. This will permit of the attendant quadrupling the output of a single mill, or a mill having but one set of tools and a single face plate, as he can successively arrange articles upon each of the face plates and put the set of tools to work upon the articles so that by the time an article has been placed upon the last or fourth face plate, the article placed upon the first face plate will have been completed so that it can be removed and another one put in its place by the time the machine has completed the article on the second face plate. In this manner, continuous succession of fresh and completed articles can be placed upon and removed from the machine without stopping any of the actuating mechanism except the tools for the face plate on which the articles are being changed.

The automatic mechanism of any or all of the shaft or screws may be thrown into and out of gear at any time by the clutch mechanism, and the shaft or screw rotated by the handle in the ordinary manner.

Although I have shown what I consider the most desirable form of constructing my improved multiple turning and boring mill, it is evident that changes and variations can be made in the different parts, and I reserve the right to make all such alterations therein as will come within the scope of the appended claims.

Having thus described my invention, what I claim as new, and desire to secure by Letters Patent, is:

1. In a multiple boring and turning mill, the combination with a base having a plurality of work supports, of a standard extending upwardly from said base with its upper end overhanging said base, cross arms extending laterally from said overhanging portion, tool holders adjustably mounted on said arms to position them above the work, and means for actuating said tool holders.

2. In a multiple boring and turning mill, the combination with a base provided with a plurality of work holding plates, means for actuating said plates, of an inverted L-shaped standard rising from said base and having its upper arm extended over the base and provided with laterally extending cross heads, a column for supporting the free end of said arm, tool holders carried by the cross heads and arranged in position to overhang the face plates, and means for actuating said tool holders.

3. The combination with a supporting base provided with work supports, of a standard rising from said base and having an arm overhanging the work supports, spaced cross heads extending laterally on opposite sides of said arm, a plurality of tool holders mounted to slide in said heads on each side of said arm, and means for adjusting said holders toward and from each other.

In testimony whereof I have signed my name to this specification in the presence of two subscribing witnesses.

LOUIS H. FARRIER.

Witnesses:
MARTIN HEERMANCE,
IRVING ELTING.